P. ST. G. KIRKE.
GAS BURNER.
APPLICATION FILED DEC. 27, 1917. RENEWED JULY 14, 1919.

1,319,226.

Patented Oct. 21, 1919.
8 SHEETS—SHEET 1.

Inventor
Percy St George Kirke
per. John R. Raworth
Attorney

P. ST. G. KIRKE.
GAS BURNER.
APPLICATION FILED DEC. 27, 1917. RENEWED JULY 14, 1919.

1,319,226.

Patented Oct. 21, 1919.
8 SHEETS—SHEET 8.

UNITED STATES PATENT OFFICE.

PERCY ST. G. KIRKE, OF WESTMINSTER, LONDON, ENGLAND.

GAS-BURNER.

1,319,226.   Specification of Letters Patent.   Patented Oct. 21, 1919.

Application filed December 27, 1917, Serial No. 209,177. Renewed July 14, 1919. Serial No. 311,760.

*To all whom it may concern:*

Be it known that I, PERCY ST. GEORGE KIRKE, a subject of the King of Great Britain and Ireland, and resident in the city of Westminster, London, England, have invented new and useful Improvements in Gas-Burners, of which the following is a specification.

This invention has reference to the generation of steam, feed water heating and the heating of liquids generally by the combustion of a mixture of fuel normally in a gaseous condition, such as coal gas, producer gas, blast furnaces gas or natural gas, hereinafter referred to as "gaseous fuel", and air.

The invention has relation to the formation of a combustible mixture of gaseous fuel and air and its combustion in apparatus for the generation of steam, feed water heating and the heating of liquids generally, hereinafter referred to as "steam generating plant" or "steam generators" and further has relation to steam generating plant in which such a combustible mixture is consumed.

The invention also has relation to the generation of steam, feed water heating and the heating of liquids generally by the employment of heat due to that process of combustion known as surface combustion, in which a homogeneous combustible mixture of gaseous fuel and air with the constituents preferably present in substantially the proportions required for full and complete combustion and formed as herein set forth, is employed and consumed in contact with, or in the neighborhood of, an incandescent mass or body of refractory material, whereby combustion is, for reasons well understood, accelerated.

The objects of the present invention are to improve the mixing and formation of the mixture of gaseous fuel and air and its combustion; to improve steam generating plants in which a mixture thus effected is employed; to overcome certain difficulties experienced in the mixing and formation of the mixture of gaseous fuel and air used in the process of combustion known as surface combustion when applied to the generation of steam, feed water heating and the heating of liquids generally in steam generating plants; to improve steam generating plants employing a mixture produced as hereinafter described, and, in some cases, to improve the thermal efficiency of such steam generating plants by enabling heat contained in the waste products of combustion to be employed to preheat the air required in the formation of the combustible mixture or for other purposes.

In the mixing of gaseous fuel and air, and the combustion of the mixture, for the generation of steam, feed water heating and the heating of liquids generally, according to this invention, the whole of the gaseous fuel is mixed with a primary supply of air insufficient to permit backfiring in a primary mixing chamber, an additional and secondary, supply of air to complete that required for the combustion of the gaseous fuel being added to and mixed with the primary mixture as it issues from its mixing chamber, the mixture so formed then passing to a combustion chamber, through a secondary mixing chamber in which the mixing is completed and the velocity of flow of the mixture is increased above that or those obtained in the primary mixing chamber or in the combustion chamber.

Apparatus for effecting the mixing of gaseous fuel and air in accordance with this invention comprises a primary mixing chamber constituted of a nozzle connected to a gaseous fuel supply pipe and provided with air admission means; a combustion chamber formed without or within the apparatus in which the steam is generated or the liquid is heated; a secondary mixing chamber located between the primary mixing chamber and the combustion chamber and such that the velocity of flow of the mixture therethrough is increased for the whole or part of its length beyond that or those obtaining in the primary mixing chamber or in the combustion chamber; and means for creating a draft on the apparatus as a whole and the passage of the mixture through the secondary mixing chamber.

The preferred form of steam generator comprises a liquid receptacle having a series of tubes extending therethrough and forming the heating surface, and in such a steam generator, the combustion chambers are formed or constituted by or within the tubes, and contain refractory combustion accelerating material, preferably as described in the specification of Letters Patent No. 17842, dated 21st December, 1915. In such preferred form of steam generator, the tubes are or may be provided with superheater coils, preferably constructed and disposed as described in the specification of Letters Patent No. 107316, dated 4th October, 1916, or in lieu of, or in addition to, superheater coils, more refractory material may advantageously be placed within the tubes so that the whole length thereof is filled and the greater part of the heat contained in the products of combustion is more rapidly transmitted through the heating surface than would be the case were such superheater coils or refractory material absent.

In the preferred form of steam generator the secondary mixing chamber may be formed or constituted of or within the tubes.

Referring now to the accompanying drawings:—

Each of the steam generators shown comprises a liquid receptacle 1 provided with a plurality of tubes 2 in the one end of each of which is located a secondary mixing chamber and a combustion chamber as herein set forth. Opposite the end of each tube 2 containing the secondary mixing chamber and combustion chamber is located a primary mixing chamber 3. The primary mixing chambers are, at the ends adjacent the tubes 2, each supported and centered with respect to the tubes 2, by means of lugs or wings 4 formed in one therewith or attached thereto, and at their other ends are each connected to, and supported by, a plate 5 hereinafter mentioned.

Figure 1:
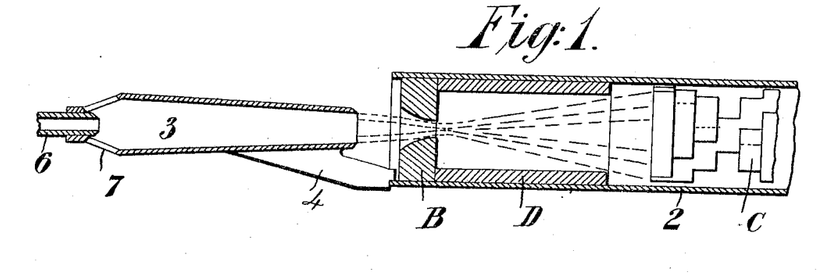
Figures 1 and 2 are diagrammatic sectional views each showing a primary mixing chamber and a part of a tube of a preferred form of steam generator containing a secondary mixing chamber and a combustion chamber.
Figure 2:
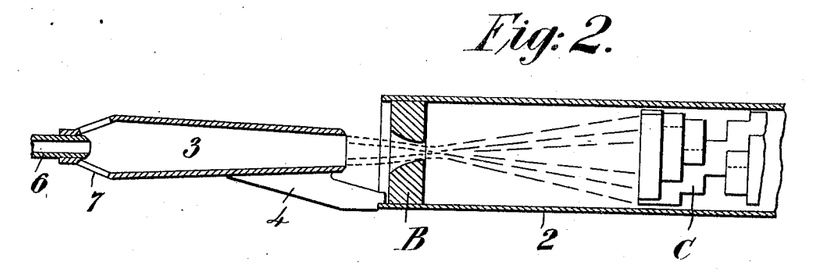
Figure 3:
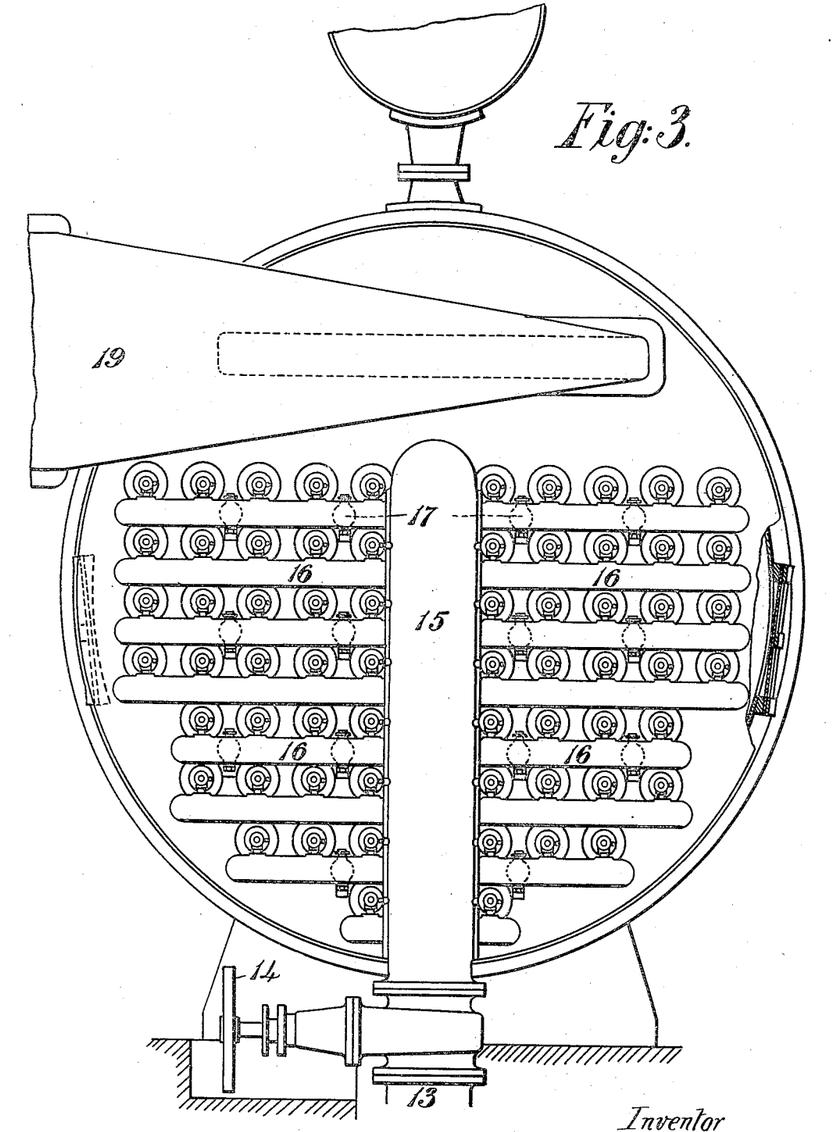
Fig. 3 is a front view of a preferred form of steam generator.

Referring now more particularly to Figs. 1 and 2, it will be seen that a primary mixing chamber comprises a nozzle 3 having a gaseous fuel supply pipe 6 connected to one end thereof and being provided with air inlet holes 7 the effective areas of which are controlled, as shown in other figures of the drawings, by the relative rotation of rings 8 contained within the ends of the nozzles and formed with a corresponding series of holes 9.

The secondary mixing chamber may be formed by shaping a tube 2 so that it is possible to water cool it wholly or partly, but it is preferable to fit a plug B of refractory material in the end of the tube 2 and to form in this plug, in whole or in part, the secondary mixing chamber. Although the secondary mixing chamber may take varying forms, the best forms have been found to consist of a hole of constant cross sectional area through the plug or of a hole converging from the inlet to a throat and diverging or increasing from the throat gradually or abruptly, or of a hole increasing from the inlet to the outlet or of a hole first increasing and then decreasing in cross sectional area.

In Figs. 1 and 2, the secondary mixing chamber is shown as comprising a plug B having a hole therethrough which converges to a throat and then opens abruptly into the tube 2; C is the refractory combustion accelerating material contained within the combustion chamber. The refractory material C is separated from the plug B and this part of the tube 2 may be lined as shown in Fig. 1, with refractory material D. The secondary mixing chamber must be of such dimensions that the mixture in passing therethrough is subjected to a thorough mixing action.

The construction and arrangement of the primary mixing chambers are such that a mixing of the gaseous fuel and air takes place therein, a further addition and mixing of air with the mixture so formed taking place between the ends of the primary mixing chambers and the entrances to the secondary mixing chambers. The gaseous fuel and air thus undergo two mixings prior to entering the combustion chamber, the air supplied through the holes 7 (primary air supply) being insufficient to permit of combustion traveling back along the primary mixing chambers. The exit ends of the primary mixing chambers are so arranged and disposed in relation to the entrances of the secondary mixing chambers that the secondary air supply supplies the additional quantity of air necessary for the combustion of the gaseous fuel.

Where the secondary air joins the mixture from the primary mixing chambers combustion commences; the maximum velocity permissible varies with the nature of the gas, and is limited by the fact that after a given velocity is reached, the flame is sucked out. It has been found, however, that in practice, the maximum velocity of the burning mixture can be enormously increased shortly after leaving the exit end of the primary mixing chamber and when combustion has been firmly established, without fear of the flame being drawn out, and in the preferred way of carrying out this invention, this fact is taken advantage of, as it is found to silence the noise of combustion, to accelerate the secondary mixing and to enable a very sensitive indication to be obtained under certain conditions. whereby the operator may know whether the proportions of air and gas entering the combustion chamber are correct or not. In methods heretofore proposed in which primary and secondary air are used, immediately the combustion commences the velocity is much reduced, as such combustion takes place in a large combustion chamber, but in the present invention the introduction of a secondary mixing chamber enables the velocity of the mixture, after combustion commences, to be carried on without greatly reducing the velocity of flow and even to be carried on and improved when the velocity is very much accelerated.

When refractory combustion accelerating material C is placed in the correct position and can be seen in the combustion chamber the mixture is most perfect when the maximum brightness is obtained; and as the best form of secondary mixing chamber reduces the view, it is found advisable, and in some cases necessary, to arrange for a sight hole 11 through the primary mixing chamber, or to have a separate sight hole into the combustion chamber, which is not obscured by the primary mixing chamber.

In some cases, another secondary mixing chamber may be provided between the secondary mixing chamber and the combustion chamber.

Figure 4:
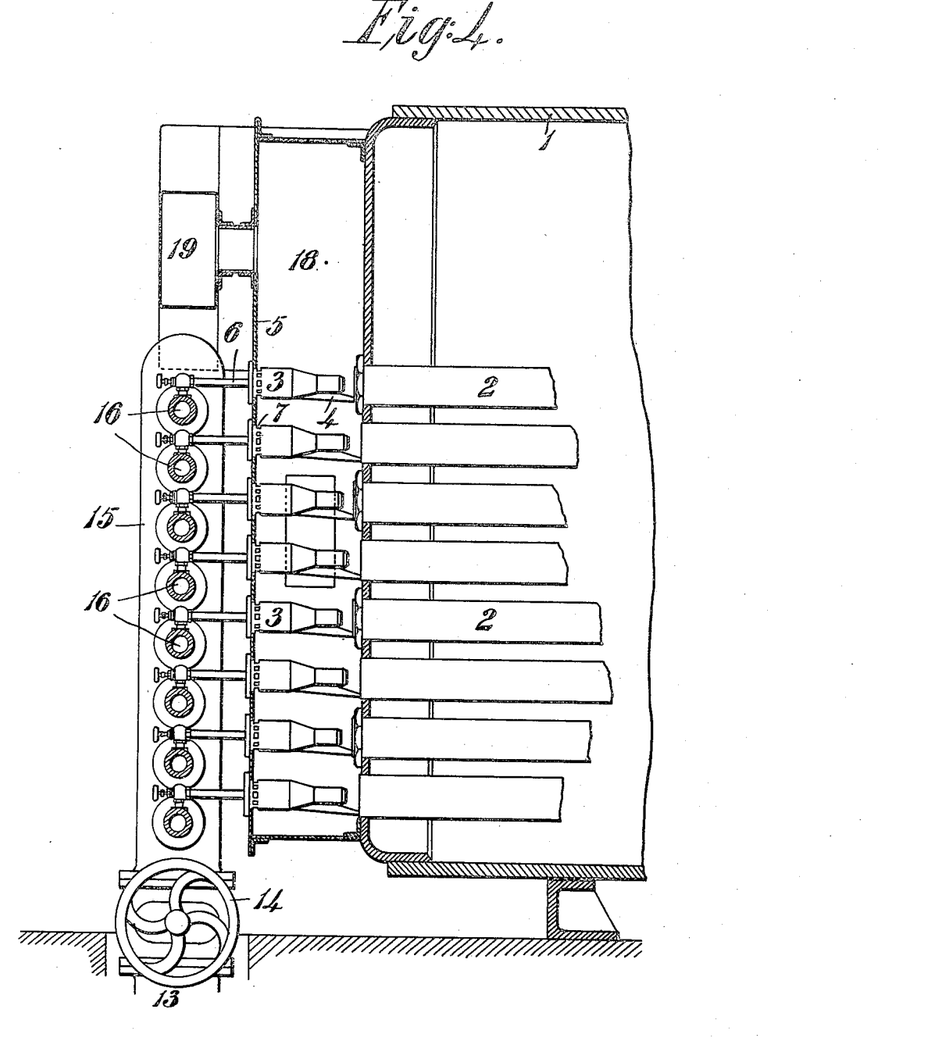
Fig. 4 is a partial vertical section.
Figure 5:
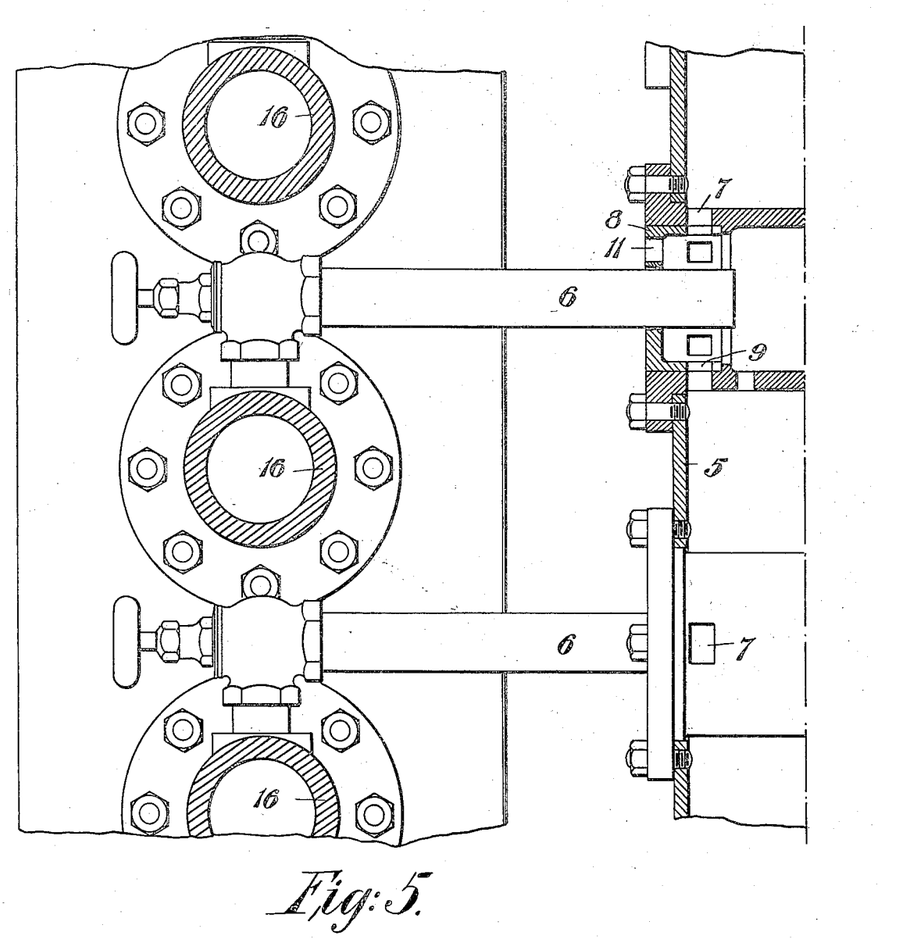
Fig. 5 is a detail view to an enlarged scale.
Figure 6:
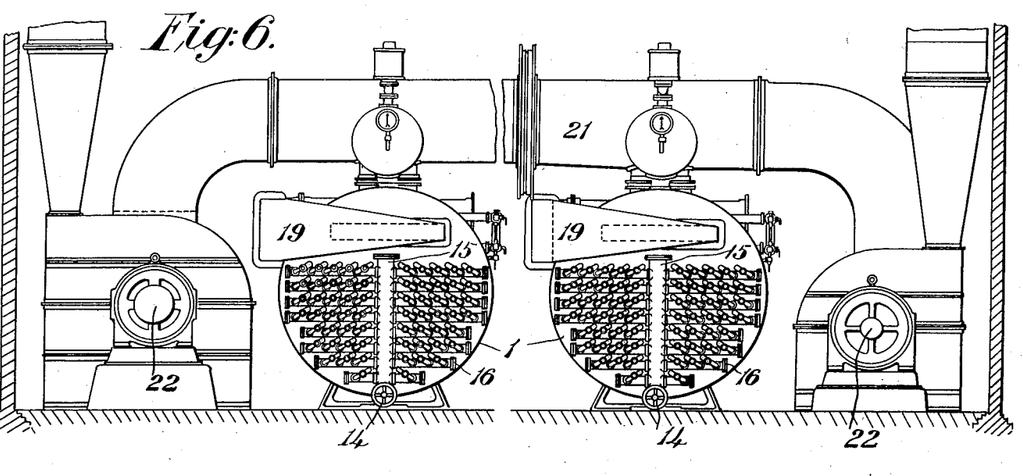
Figs. 6, 7 and 8 are, respectively, a front elevation, a plan view and a side elevation, of a steam generating plant in accordance with this invention.
Figure 7:
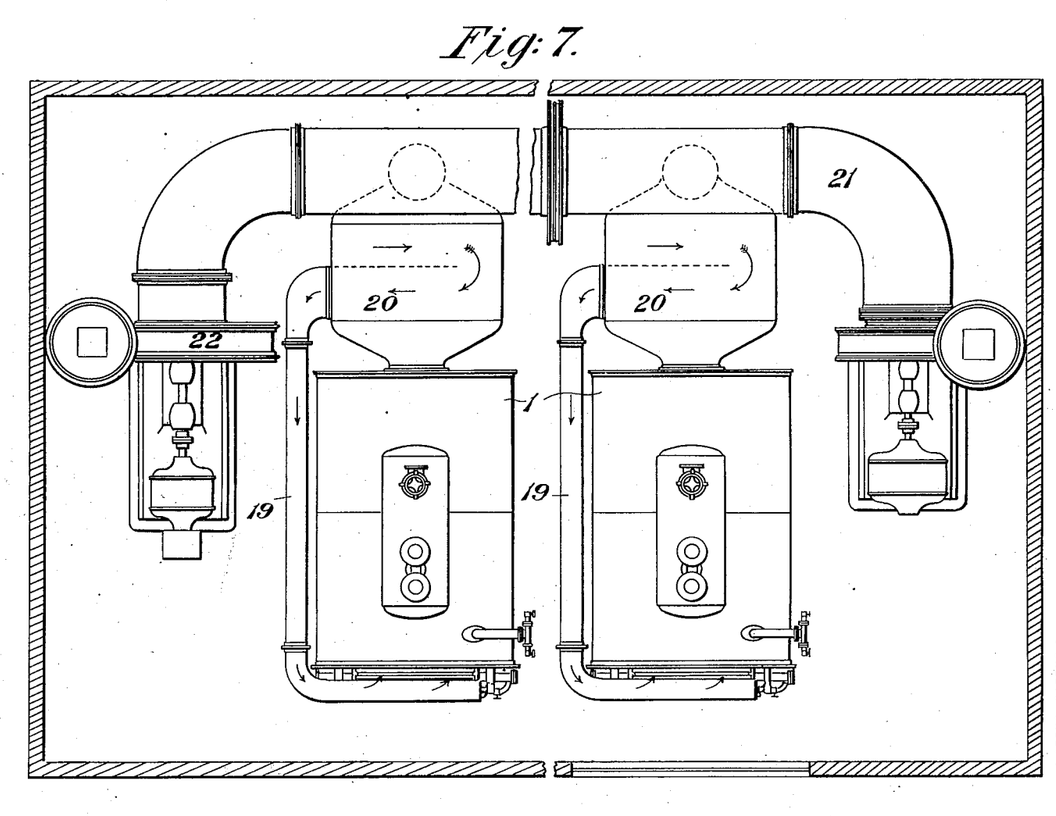
Figure 8:
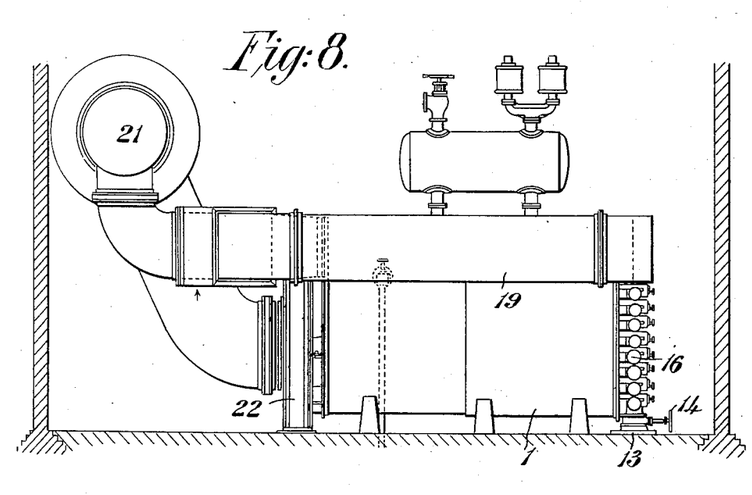

The gas is delivered to each unit of an installation (see Figs. 4 and 5) from a gas main 13, controlled by a valve 14, to a main header 15 having a plurality of secondary headers 16 connected thereto and each secondary header 16 has a plurality of separately controlled gas pipes 6 connected thereto. 17 are openings in the plate 5 through which lighting up is effected, each controlled by a hinged door or plate.

The primary air supply and/or the secondary air supply may be heated and the heating may be effected by waste heat from the apparatus: advantageously, the flow of air through the heater is caused by the same means that cause, or set up, a draft on the apparatus.

A hot air chamber 18 is formed at the front of each unit of an installation, the cover plate of which is constituted by a plate 5 hereinbefore mentioned. Each chamber 18 is in connection by a duct 19 with an air heater 20 of any suitable construction. Each unit of an installation has an air heater 20, and each air heater forms a connection between the exit ends of its tubes 2 and an exhaust main 21 and a duct for the passage of waste heat. 22 are electrically driven fans connected with the exhaust main 21: the fans put a draft on the installation and induce the flow of air through the heaters 20 to the chambers 18 and so to the primary and secondary mixing chambers.

What I claim is:—

1. A system of surface combustion for fuel mixed with air comprising a primary mixing chamber, a secondary mixing chamber leading from said primary mixing chamber, a surface combustion chamber leading from said secondary mixing chamber and means for preheating the diluting air.

2. A system according to claim 1, wherein the said preheating means has further means for abstracting heat from the products of the surface combustion.

3. A system according to claim 1 which includes means for a suction draft for drawing the fuel and air mixture through the surface combustion chamber.

4. A system of combustion for fuel mixed with air comprising a primary mixing chamber, a secondary mixing chamber leading from said primary mixing chamber, a flameless combustion chamber leading from said secondary mixing chamber, means for preheating the diluting air, said preheating means having further means for abstracting heat from the products of combustion and having a suction draft means for drawing the products of combustion through the said preheating means.

5. A system of combustion for fuel mixed with air comprising a flame combustion chamber, a flameless combustion chamber, means to inject a mixture of fuel and air into the flame combustion chamber, and means to conduct the burning mixture from the flame combustion chamber to the flameless combustion chamber.

6. A system according to claim 5 having means for preheating the air of the fuel mixture.

Dated this 20th day of November, 1917.

PERCY ST. G. KIRKE.